US008756659B2

(12) United States Patent
Ruckart

(10) Patent No.: US 8,756,659 B2
(45) Date of Patent: Jun. 17, 2014

(54) ACCESS AUTHORIZATION SERVERS, METHODS AND COMPUTER PROGRAM PRODUCTS EMPLOYING WIRELESS TERMINAL LOCATION

(75) Inventor: John P. Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1795 days.

(21) Appl. No.: 11/737,338

(22) Filed: Apr. 19, 2007

(65) Prior Publication Data

US 2008/0261560 A1 Oct. 23, 2008

(51) Int. Cl.
*H04L 29/06* (2006.01)
*G06F 21/35* (2013.01)
*H04L 9/32* (2006.01)

(52) U.S. Cl.
CPC ............. *G06F 21/35* (2013.01); *H04L 63/0492* (2013.01); *H04L 9/3234* (2013.01)
USPC .......................................................... 726/4

(58) Field of Classification Search
CPC .... H04L 63/0492; H04L 9/3234; G06F 21/35
USPC .......................................................... 726/4
See application file for complete search history.

(56) References Cited

U.S. PATENT DOCUMENTS

| 2,371,746 | A |   | 3/1945 | Evans et al. |
| 4,004,925 | A |   | 1/1977 | Van Besauw et al. |
| 5,391,507 | A |   | 2/1995 | Kwasnick et al. |
| 6,058,311 | A | * | 5/2000 | Tsukagoshi ................ 455/435.1 |
| 6,282,427 | B1 | * | 8/2001 | Larsson et al. ............. 455/456.2 |
| 6,338,988 | B1 |   | 1/2002 | Andry et al. |
| 6,377,810 | B1 | * | 4/2002 | Geiger et al. ............. 455/456.2 |
| 6,612,488 | B2 |   | 9/2003 | Suzuki |
| 6,636,833 | B1 |   | 10/2003 | Flitcroft et al. |
| 6,716,101 | B1 | * | 4/2004 | Meadows et al. .......... 455/456.1 |
| 6,754,482 | B1 | * | 6/2004 | Torabi ............................ 455/410 |
| 6,845,241 | B2 | * | 1/2005 | Edlund et al. ............. 455/456.1 |
| 6,913,194 | B2 |   | 7/2005 | Suzuki |
| 6,934,861 | B2 | * | 8/2005 | Haala ................................ 726/5 |
| 6,947,978 | B2 |   | 9/2005 | Huffman |
| 7,056,834 | B2 |   | 6/2006 | Mei et al. |
| 7,100,510 | B2 |   | 9/2006 | Brost et al. |
| 7,104,444 | B2 |   | 9/2006 | Suzuki |
| 7,412,400 | B1 | * | 8/2008 | Bhela et al. .................... 705/1.1 |
| 7,617,542 | B2 | * | 11/2009 | Vataja .............................. 726/30 |
| 7,627,122 | B1 | * | 12/2009 | Horn et al. ..................... 380/270 |
| 7,801,542 | B1 | * | 9/2010 | Stewart .......................... 455/518 |

(Continued)

FOREIGN PATENT DOCUMENTS

DE  2506445  8/1975
FR  2595155  2/1986

*Primary Examiner* — David García Cervetti
(74) *Attorney, Agent, or Firm* — Parks IP Law LLC; Mickki D. Murray, Esq.

(57) ABSTRACT

An access authorization server includes an access authorization processor configured to receive information concerning an access attempt at a subscribed location, to obtain location information from a wireless network provider for a wireless terminal associated with the subscribed location, to correlate a location of the wireless terminal with the subscribed location, to generate authorization information for the access attempt in response to a result of the correlation of the location of the wireless terminal and the subscribed location, and to transmit the authorization information to a security processor at the subscribed location or to the wireless terminal. Corresponding method and computer program embodiments are disclosed.

20 Claims, 7 Drawing Sheets

(56) References Cited

U.S. PATENT DOCUMENTS

| | | | |
|---|---|---|---|
| 8,358,609 B1* | 1/2013 | Cona et al. | 370/315 |
| 8,391,909 B2* | 3/2013 | Stewart | 455/518 |
| 8,504,089 B2* | 8/2013 | Stewart | 455/518 |
| 2001/0053694 A1* | 12/2001 | Igarashi et al. | 455/433 |
| 2002/0061745 A1* | 5/2002 | Ahn et al. | 455/432 |
| 2002/0139859 A1* | 10/2002 | Catan | 235/472.02 |
| 2002/0164995 A1* | 11/2002 | Brown et al. | 455/456 |
| 2002/0165910 A1* | 11/2002 | Brown et al. | 709/203 |
| 2002/0176579 A1* | 11/2002 | Deshpande et al. | 380/270 |
| 2003/0008662 A1* | 1/2003 | Stern et al. | 455/456 |
| 2003/0016166 A1* | 1/2003 | Jandrell | 342/357.1 |
| 2003/0017871 A1* | 1/2003 | Urie et al. | 463/29 |
| 2003/0023378 A1* | 1/2003 | Ichimura | 701/213 |
| 2003/0023476 A1* | 1/2003 | Gainey | 705/10 |
| 2003/0083052 A1* | 5/2003 | Hosaka | 455/414 |
| 2003/0120940 A1* | 6/2003 | Vataja | 713/193 |
| 2003/0130987 A1* | 7/2003 | Edlund et al. | 707/3 |
| 2003/0154293 A1* | 8/2003 | Zmolek | 709/228 |
| 2004/0073787 A1* | 4/2004 | Ban et al. | 713/159 |
| 2004/0122960 A1* | 6/2004 | Hall et al. | 709/229 |
| 2004/0139320 A1* | 7/2004 | Shinohara | 713/168 |
| 2004/0185830 A1 | 9/2004 | Joao et al. | |
| 2004/0208343 A1* | 10/2004 | Golden et al. | 382/110 |
| 2004/0229411 A1 | 11/2004 | Battersby | |
| 2004/0248571 A1* | 12/2004 | Robinson et al. | 455/433 |
| 2004/0254868 A1* | 12/2004 | Kirkland et al. | 705/35 |
| 2005/0026596 A1* | 2/2005 | Markovitz | 455/411 |
| 2005/0066179 A1* | 3/2005 | Seidlein | 713/182 |
| 2005/0128989 A1* | 6/2005 | Bhagwat et al. | 370/338 |
| 2005/0250516 A1* | 11/2005 | Shim | 455/456.1 |
| 2006/0069914 A1* | 3/2006 | Rupp et al. | 713/168 |
| 2006/0069916 A1* | 3/2006 | Jenisch et al. | 713/172 |
| 2006/0085357 A1* | 4/2006 | Pizarro | 705/64 |
| 2006/0095790 A1* | 5/2006 | Nguyen et al. | 713/186 |
| 2006/0136395 A1* | 6/2006 | Rhee et al. | 707/3 |
| 2006/0253530 A1* | 11/2006 | Wu et al. | 709/204 |
| 2006/0282662 A1* | 12/2006 | Whitcomb | 713/156 |
| 2007/0118284 A1* | 5/2007 | Sposato et al. | 701/213 |
| 2008/0045236 A1* | 2/2008 | Nahon et al. | 455/456.1 |
| 2008/0113785 A1* | 5/2008 | Alderucci et al. | 463/29 |
| 2008/0113786 A1* | 5/2008 | Alderucci et al. | 463/29 |
| 2008/0113787 A1* | 5/2008 | Alderucci et al. | 463/29 |
| 2008/0164308 A1* | 7/2008 | Aaron et al. | 235/380 |
| 2009/0264122 A1* | 10/2009 | Van Loon et al. | 455/433 |

* cited by examiner

ACCESS AUTHORIZATION SERVERS, METHODS AND COMPUTER PROGRAM PRODUCTS EMPLOYING WIRELESS TERMINAL LOCATION

FIELD OF THE INVENTION

This invention relates to computer servers, methods and computer program products, and, more particularly, to access authorization servers, methods and computer program products.

BACKGROUND

Securing access to a physical location, such as a home or office location, is a continuing concern for property owners. Traditionally, manual locks have been used to secure homes and offices. However, it may be impractical and/or inconvenient to unlock and lock a door by hand every time it is used, especially in a business setting where many people may use a given door every day. Thus, many doors are left unlocked during the day, and are supposed to be locked at night and/or when the property is left unattended. However, a lock may be accidentally left open, increasing the security risk at the location.

In many offices, manual locks have been replaced by automatic keycard-based access systems. In keycard-based systems, automatic locks and keycard scanners are placed on or near facility doors. When a person, such as an employee, wants to enter the door, he or she presents a keycard, which may contain an active and/or passive circuit, such as an RFID tag, which is scanned by the keycard scanner. A keycard number, such as a serial number, is read by the keycard scanner and is compared at a server to a list of authorized keycard numbers. If the scanned keycard number matches an authorized keycard number, access is granted and the door may be temporarily unlocked to permit entry.

Conventional access control methods have a number of drawbacks. For example, manual locks may be left unlocked accidentally. Even if they are locked, manual locks can be picked, broken, or otherwise compromised, for example, if a key is lost. While keycard systems are convenient, they may be prohibitively expensive to install, especially in a home and/or small business setting. Furthermore, keycard entry systems may be compromised if a keycard is lost or stolen and the loss of the keycard is not reported and/or the keycard number is not promptly removed from the authorized list when it is reported as lost or stolen.

SUMMARY

Some embodiments of the invention provide an access authorization server including an access authorization processor that (1) receives information concerning an access attempt at a subscribed location, (2) obtains location information from a wireless network provider for a wireless terminal associated with the subscribed location, (3) correlates a location of the wireless terminal with the subscribed location, (4) generates authorization information for the access attempt in response to a result of the correlation of the location of the wireless terminal and the subscribed location, and (5) transmits the authorization information to a security processor at the subscribed location or to the wireless terminal.

The access authorization processor may also obtain additional authentication information concerning the access attempt, such as an access code and/or biometric identification data, if the location of the wireless terminal does not correspond to the subscribed location.

The information concerning the access attempt may include an access code entered at the subscribed location. The access authorization processor may retrieve a record from a subscriber database that is associated with the subscribed location that includes a registered access code in response to receiving the information concerning the access attempt. The access authorization processor may compare the access code provided in the information with the registered access code.

The access authorization processor may obtain additional authentication information concerning the access attempt if the access code received in the information does not match the registered access code. In some embodiments, the access authorization processor may deny the access attempt if the access code provided in the information does not match the registered access code.

The access authentication processor may determine if the wireless terminal is near the subscribed location, and, if so, may obtain authentication information from a user of the wireless terminal. The access authentication processor may authenticate the user of the wireless terminal using the authentication information, and in response to determining that the user of the wireless terminal is authentic, may permit access to the user to the subscribed location.

The authentication processor may, in response to determining that the user of the wireless terminal is authentic, provide the wireless terminal and the security processor with a temporary access code to be used by the user to obtain access to the subscribed location.

In some embodiments, the authentication processor may automatically prompt the user for authentication information in response to determining that the wireless terminal is near the subscribed location.

Access authorization methods according to some embodiments of the invention include receiving information concerning an access attempt at a subscribed location, obtaining location information from a wireless network provider for a wireless terminal that is associated with the subscribed location, correlating a location of the wireless terminal with the subscribed location, generating authorization information for the access attempt in response to a result of the correlation of the location of the wireless terminal and the subscribed location, and transmitting the authorization information to a security processor at the subscribed location or to the wireless terminal.

Some embodiments of the invention provide computer program products for access authorization. The computer program products include a computer readable storage medium having computer readable program code embodied in the medium. The computer readable program code includes computer readable program code configured to receive information concerning an access attempt at a subscribed location, computer readable program code configured to obtain location information from a wireless network provider for a wireless terminal that is associated with the subscribed location, computer readable program code configured to correlate a location of the wireless terminal with the subscribed location, and computer readable program code configured to generate authorization information for the access attempt in response to a result of the correlation of the location of the wireless terminal and the subscribed location.

It will be understood that while various method embodiments of the invention have been described above, analogous server, system and computer program embodiments also may be provided according to other embodiments of the invention.

Moreover, the various embodiments of the invention that are described herein may be combined in various combinations and subcombinations.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
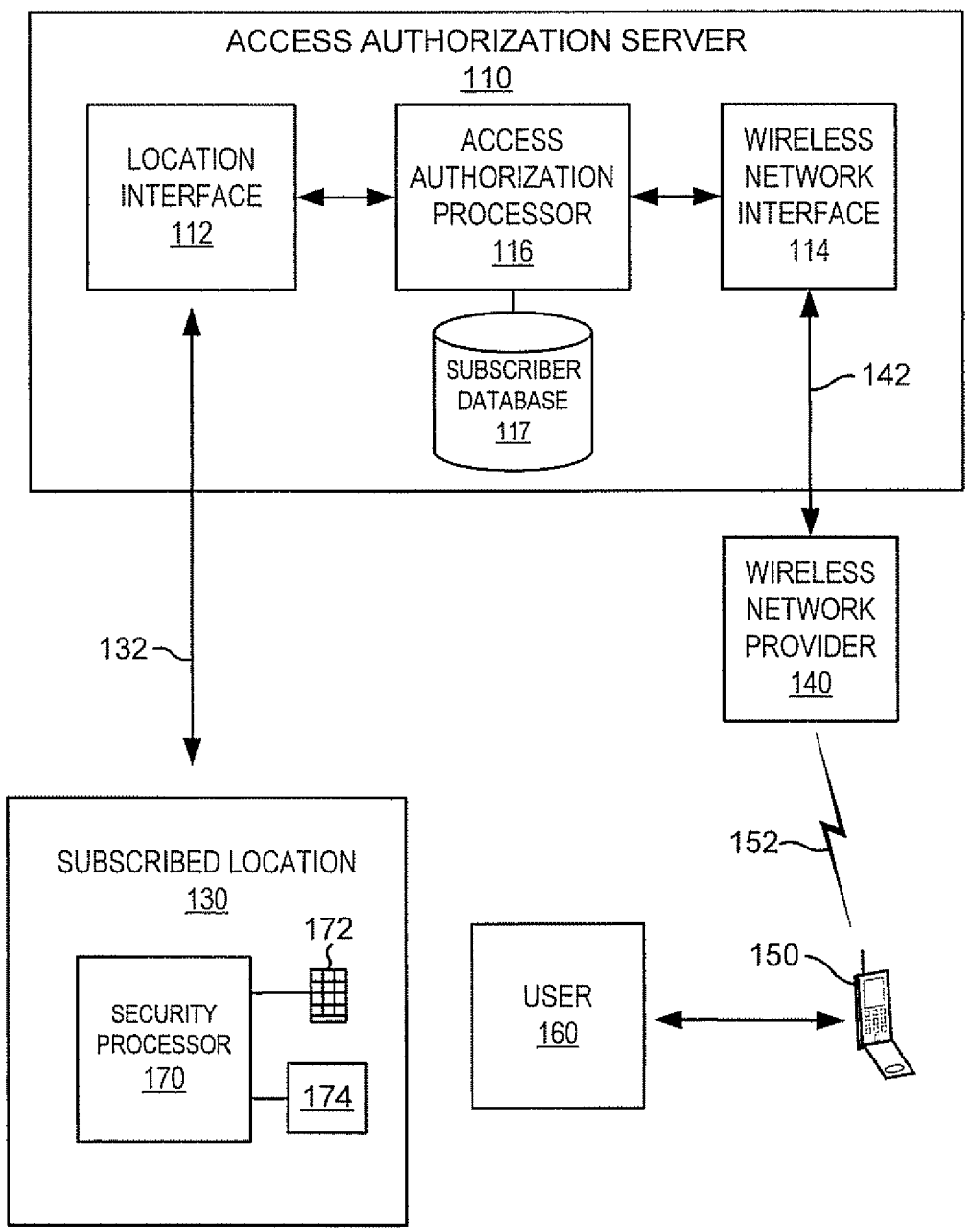
FIG. 1 is a block diagram of wireless terminal location based access authorization servers, systems, methods and/or computer program products according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable storage medium having computer-usable program code embodied in the medium for use by or in connection with an instruction execution system. In the context of this document, a computer-usable medium may be any medium that can store the program for use by or in connection with the instruction execution system, apparatus, or device.

The computer-usable or computer-readable medium may be, for example but not limited to, an electronic, magnetic, optical, electromagnetic, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

FIG. 1 is a block diagram of access authorization servers, systems, methods and/or computer program products according to various embodiments of the present invention. Referring now to FIG. 1, an access authorization server 110 includes a location interface 112, a wireless network interface 114 and an access authorization processor 116. The access authorization processor 116 can access a local or remote subscriber database 117 that contains information regarding locations secured by a system according to embodiments of the invention. Such locations are referred to herein as "subscribed locations." The server 110 may be embodied as one or more enterprise, application, personal, pervasive and/or embedded computer systems that are connected via a wireless and/or wired, private and/or public network, including the Internet.

The location interface 112 is configured to receive information about access attempts at a subscribed location 130, which may be, for example, a home or business location. The information about the access attempt may be received from a security processor 170 located at the subscribed location 130 over private and/or public wired and/or wireless communications links 132.

The security processor 170 may be configured to perform security processing functions at the subscribed location 130. In particular, in some embodiments, the security processor 170 may be configured to receive information regarding an access attempt at the subscribed location 130 and to process the received information and/or to send the received information, or the processed information, to the access authorization server 110 in an access authorization request. In some embodiments, the security processor 170 may include a keypad 172 by which an access code and/or an identification code may be entered by a person attempting to gain access to the subscribed location 130. The security processor 170 may further include a biometric input device 174 configured to obtain biometric data about the person attempting to gain access. For example, a biometric input device 174 may include a camera configured to photograph the person attempting to gain access to the subscribed location, a fingerprint scanner, a voiceprint scanner, a retinal scanner, or any other device configured to obtain biometric data. In some embodiments, the security processor 170 may contain no input devices or only limited input devices, such as a keypad 172.

In some embodiments, the access authorization server 110 can receive and process access attempts from a plurality of subscribed locations 130. However, in other embodiments, the access authorization server 110 may service a single subscribed location 130. In some embodiments, the access authorization server 110 may be implemented in or with the security processor 170 at the subscribed location 130.

Continuing with the description of FIG. 1, the wireless network interface 114 is configured to obtain location information for wireless terminals 150 that are serviced by one or more wireless network providers 140. The location information may be obtained in response to a specific inquiry related to an access authorization request and/or may be obtained periodically by the wireless network interface 114 polling the wireless network providers 140 and/or by the wireless network providers 140 periodically providing the location information to the wireless network interface 114. The wireless network providers 140 may communicate with the wireless network interface 114 over one or more private and/or public wired and/or wireless communications links 142. The wireless terminals 150 may communicate with the wireless network providers 140 over one or more wireless links 152 using conventional wireless protocols. As used herein, the term "wireless terminal" includes, for example, cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver. By providing an interface to multiple wireless network providers 140, location information concerning multiple wireless terminals 150 that are registered to a given user may be obtained, which can be used to permit entry to a location, as will be described below. However, in other embodiments, the server 110 may query a single wireless network provider 140.

Although the server 110 is illustrated in FIG. 1 as a standalone system that is separate from the security processor 170 and the wireless network provider(s) 140, it will be appreciated that the server 110 could be operated by and/or located at the security processor 170, the wireless network provider 140 and/or at some other location.

Still referring to FIG. 1, an access request may be initiated when a person, such as a user 160, attempts to gain access to a subscribed location 130. For example, the user 160 may enter a short identification code corresponding to the user 160. When the user 160 attempts to gain access to the subscribed location 130, the security processor 170 may contact the access authorization server 110 to obtain authorization for the access.

The access authorization processor 116 in the access authorization server 110 communicates with the location interface 112 and the wireless network interface 114. In some embodiments, the access authorization processor 116 is responsive to receipt of an access authorization request for an access attempt at a subscribed location 130. In particular, upon receipt of the access authorization request, the access authorization processor 116 may retrieve a record from the subscriber database 117 associated with the subscribed location 130. The record may include an identification of a wireless terminal that is associated with a user 160 that is permitted access to the subscribed location 130. The identification can include, for example, a telephone number, electronic serial number (ESN), or international mobile subscriber identity (IMSI) associated with the wireless terminal 150. The record may also include, for example, the identities of one or more wireless network providers 140 associated with the wireless terminal 150, and/or an e-mail address or other electronic address associated with the user 160.

The access authorization processor 116 may then instruct the wireless network interface 114 to obtain location information from one or more of the plurality of wireless network providers 140 for the wireless terminal 150.

The access authorization request can include an identification of the subscribed location, and possibly an identification of the person (e.g. the user 160) that is attempting to gain access. The access authorization request may also include, for example, a security code and/or identification code entered by the person attempting to gain access, and/or biometric identification data obtained by the security processor 170 from the person attempting to gain access.

Using information obtained from the subscriber database 117, the wireless network interface 114 can obtain location information for one or more wireless terminals 150 associated with the user 160 and/or the subscribed location 130 by polling the wireless network providers 140 and/or by searching pre-stored location information.

The access authorization processor 116 is also configured to correlate the location of a subscribed location with the location(s) of at least one wireless terminal 150, and to generate authorization information for the access request based on the correlation of the subscribed location 130 and the location of the wireless terminal 150. Accordingly, if it is determined that a wireless terminal 150 associated with the user 160 is located sufficiently close to the subscribed location 130, there may be an enhanced likelihood that the person requesting access to the subscribed location 130 is authentic, and that additional authentication may not be required. Specific embodiments will be described in detail below.

Accordingly, in order to take advantage of the access authorization systems and/or methods according to embodiments of the invention, a subscriber, which may be, for example, a business or a property owner, may register certain information with the access authorization server 110. In particular, the subscriber may register one or more subscribed locations 130, and one or more users 160 that are permitted access to the subscribed location(s) 130. In addition, the subscriber may register the identities of one or more wireless terminals 150 associated with the users 160, and possibly the names of the wireless network providers 140 associated with the one or more wireless terminals 150. Furthermore, the subscriber may register one or more electronic addresses associated with the users 160 and/or the wireless terminals 150. This information may be used as described below to provide enhanced security for access authorizations.

The subscribed location 130 may be provided by the user 160 to the access authorization server 110 as a physical address which may become converted by the access authorization server 110 into longitude/latitude or other positional information. Geographical information systems that are capable of converting addresses into longitude/latitude information, such as Google® Maps or MapQuest® are well known to those having skill in the art and need not be described further herein.

Many techniques may be used by a wireless network provider 140 to determine a location of a wireless terminal 150. For example, the wireless terminal 150 may include a GPS or other location tracking circuitry therein. Alternatively, triangulation techniques based on the wireless network cells to which a given wireless terminal 150 is communicating may be used. Other techniques also may be used.

Accordingly, an access authorization server 110 according to some embodiments of the present invention can provide access authorization services for multiple subscribed locations 130 and/or multiple users 160, and can correlate a subscribed location 130 with the location of one or more wireless terminals 150 that are registered to users 160 associated with the subscribed location 130.

Figure 2:
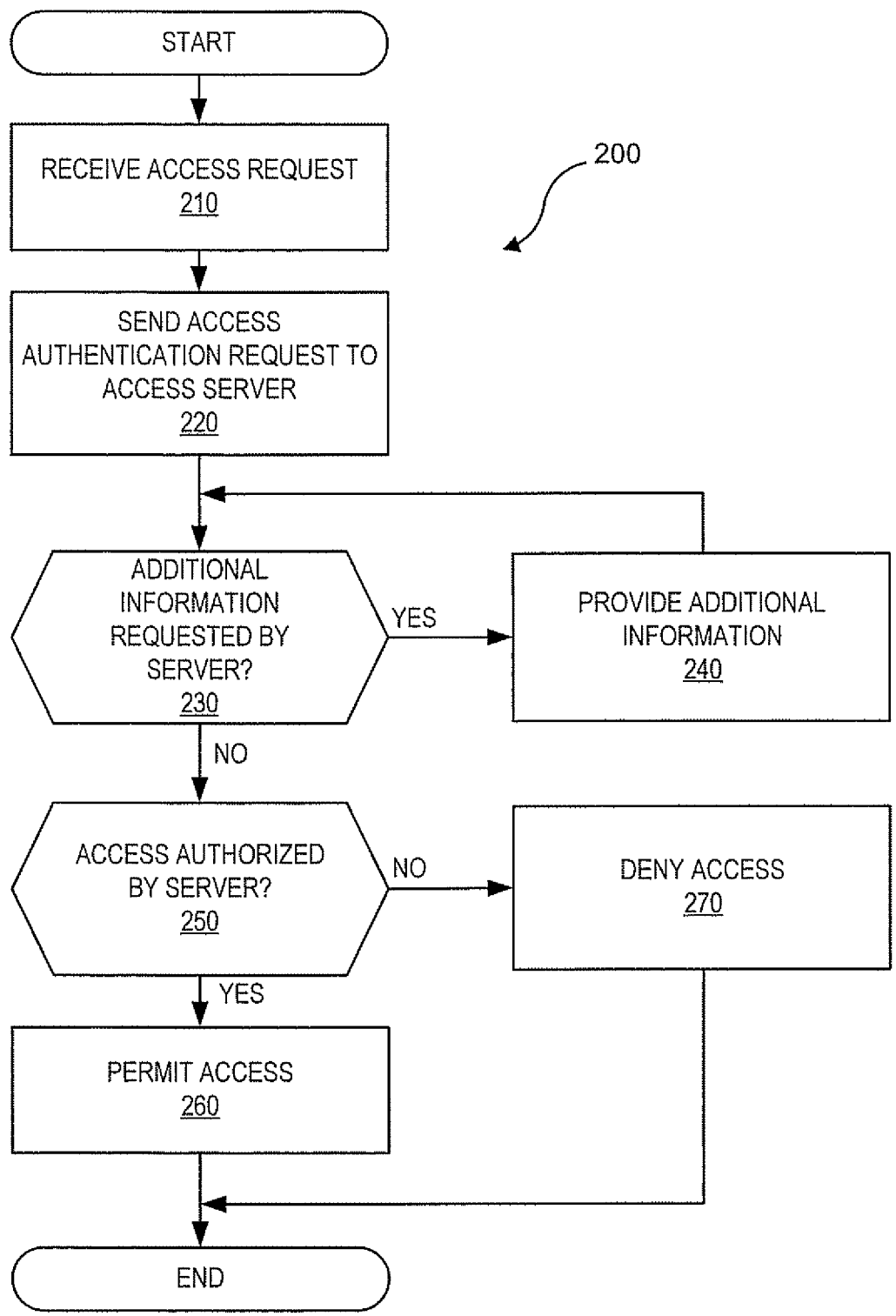
FIGS. 2-3 are flowcharts of operations that may be performed for access authorization according to various embodiments of the present invention.

FIG. 2 is a flowchart of operations 200 that may be performed by a security processor, such as the security processor 170, when a person attempts to gain access to the subscribed location 130. In response to the receipt of an access request (Block 210), the security processor 170 may send an access authentication request to the access authentication server 110 (Block 220). As noted above, the access request may be initiated when a person attempts to gain access to the subscribed location 130, for example, by entering an identification code into a keypad 172. The access authentication request may identify the subscribed location 130 to which access is being requested, and may also identify the person attempting to gain access, for example, by providing an identification code that was entered into the keypad 172 by the person attempting to gain access. The access authentication request may also include biometric identification data obtained by the security processor 170 regarding the person attempting to gain access.

The security processor 170 may check to see if additional information, such as additional authentication information, is requested by the access authentication server 110 (Block 230). If so, the security processor may obtain and provide the additional information to the access authentication server (Block 240). Otherwise, the security processor 170 checks to see if access is authorized by the server (Block 250). Based on the response from the access authentication server 110, access is either permitted (Block 260) or denied (Block 270).

Figure 3:
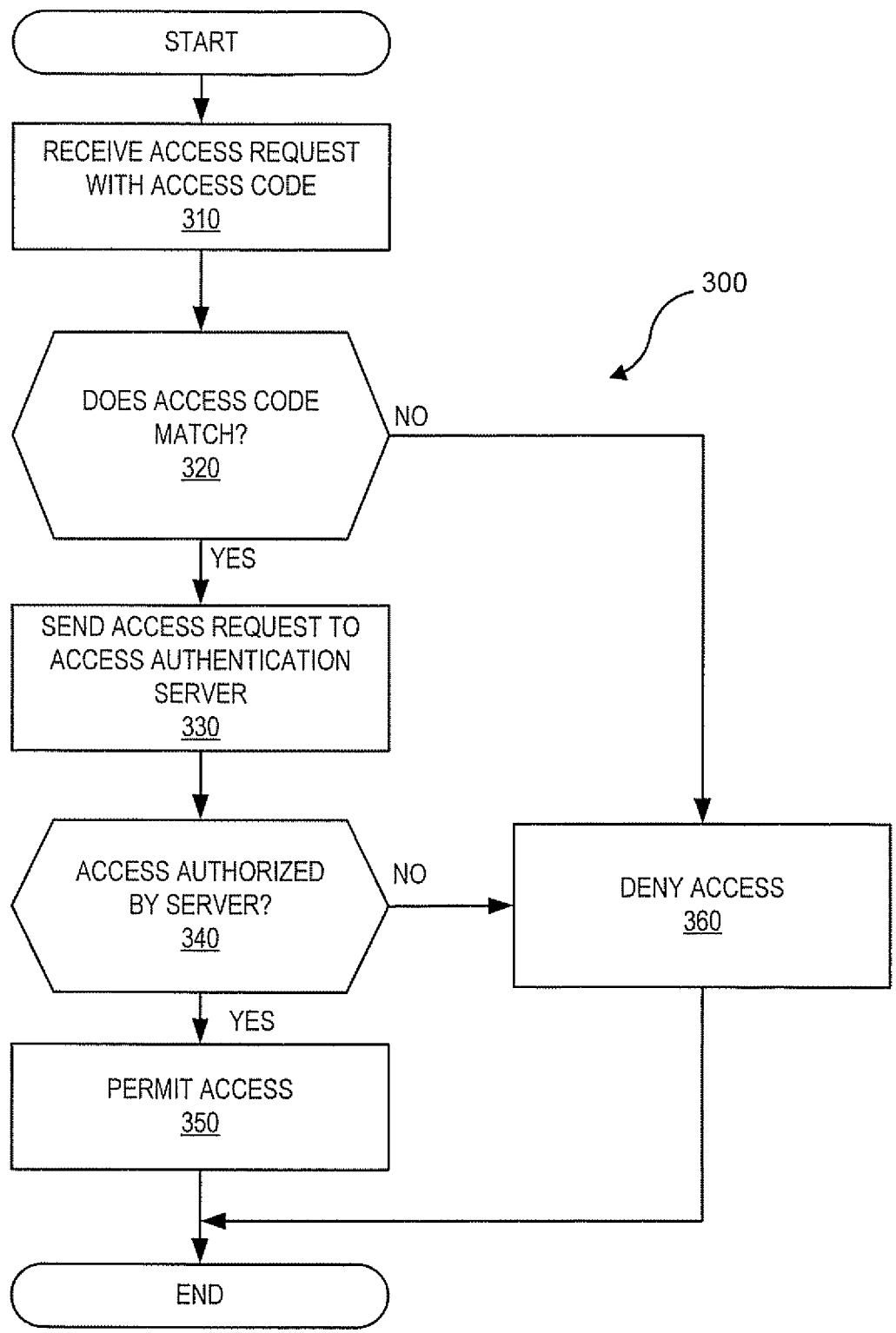

FIG. 3 is a flowchart of operations 300 that may be performed by a security processor, such as the security processor 170, according to further embodiments of the invention. According to the operations 300, an access code, such as a personal identification number (PIN) is received by the security processor 170 along with the access request (Block 310). The security processor 170 checks to see if the access code matches a stored access code (Block 320). If the access code does not match the stored access code, the access is denied (Block 360). However, if the access code does match, and access authorization request is sent to the access authentication server 110 to further authenticate the access based on wireless terminal location (Block 330). The security processor then waits to see if access is authorized by the server (Block 340). Based on the response from the access authentication server 110, access is either permitted (Block 350) or denied (Block 360).

Figure 4:
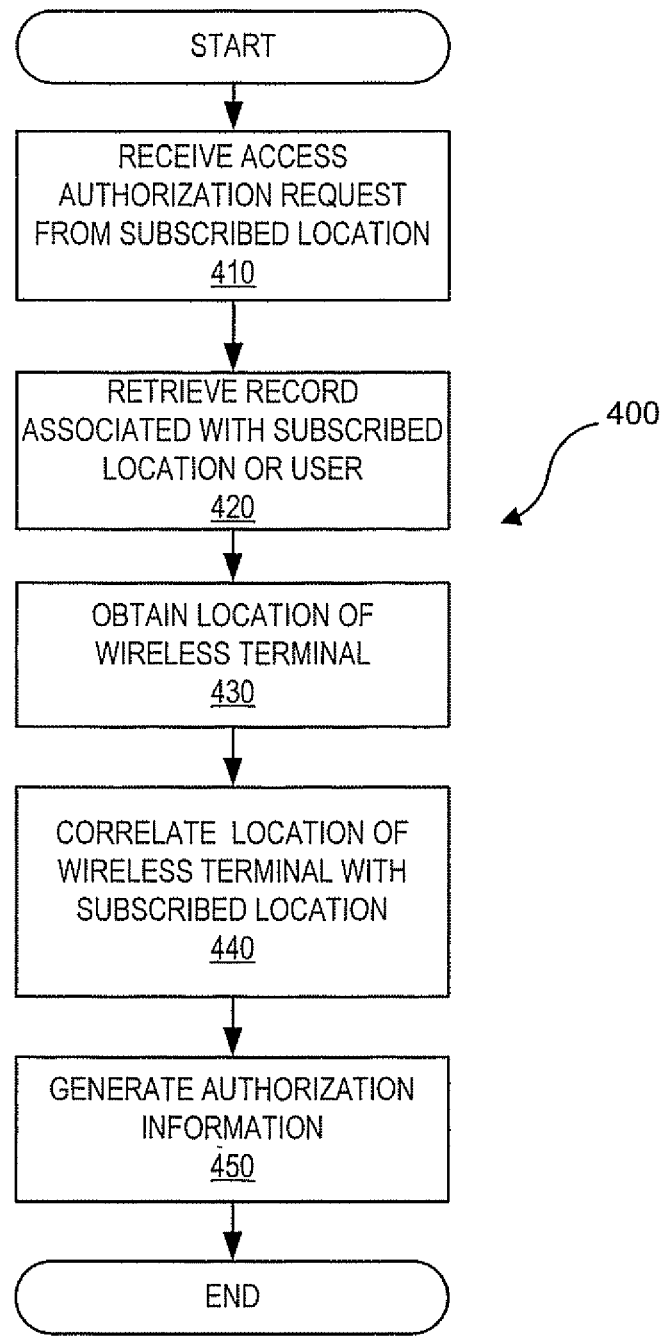
FIGS. 4-7 are flowcharts of operations that may be performed by an access authorization server according to various embodiments of the present invention.

FIG. 4 is a flowchart of operations 400 that may be performed by an access authorization server, such as the access authorization server 110 of FIG. 1, according to some embodiments of the present invention. Referring now to FIG. 4, at Block 410, an access authorization request containing information about an access attempt at a subscribed location 130 for which authorization is requested is received at the access authorization server 110.

Referring to Block 420, in response to receiving access authorization request, the access authorization server 110 may retrieve a record from the subscriber database 117 that corresponds to the subscribed location 130 identified in the access authorization request. The record may include, for example, an identification of one or more users 160 that are permitted access to the subscribed location 130, one or more wireless terminal identifiers, such as telephone numbers/ESN/IMSI of wireless terminals 150 that are associated with the users 160 and/or with the subscribed location 130, the identities of one or more wireless network providers associated with the wireless terminals 150, and/or e-mail or other electronic addresses associated with the users 160.

Referring now to Block 430, in response to receiving the information about the access request, the access authorization server 110 may direct the wireless network interface 114 to obtain location information for one or more wireless terminals 150 that were identified in the profile associated with the subscribed location 130. If a particular user 160 is identified as requesting access to the subscribed location 130, the access authorization server 110 may direct the wireless network interface 114 to obtain location information only for the wireless terminal(s) 150 associated with the identified user 160.

In order to obtain the location information, the wireless network providers 140 may be polled. The polling may take place via communication between the wireless network interface 114 and the wireless network provider 140 over links 142. It will also be understood by those having skill in the art that, in other embodiments, polling need not take place, but, rather, information concerning locations of wireless terminals 150 may be provided periodically by the wireless network providers 140 to the wireless network interface 114, and pre-stored by the wireless network interface 114 and/or the access authorization server 110.

It also will be understood that embodiments of the invention can allow multiple wireless network providers 140 to be polled or otherwise to provide location information. By allowing multiple wireless network providers 140 to provide location information, enhanced security may be provided. For example, when multiple wireless terminals 150 are associated with a given user 160, the locations of all of the wireless terminals 150 may be correlated with the subscribed location 130.

Continuing with the description of FIG. 4, when the locations of the wireless terminals 150 have been obtained from all of the wireless network providers 140, then at Block 440 the access authorization server 110 correlates the location of the subscribed location 130 and the location(s) of at least one wireless terminal 150 identified in the subscriber record to determine if the location of a least one wireless terminal 150 corresponds to the subscribed location 130. Finally, at Block 450, authorization information for the access request is generated based on the correlation of the subscribed location 130 with the location of the wireless terminal 150.

According to some embodiments of the invention, enhanced authentication of an access attempt may be performed if the location of a wireless terminal 150 associated with the user 160 does not correspond to the subscribed location 130 to which access is being requested. The location of a wireless terminal 150 may correspond to a subscribed location 130 if it is determined that the location of the wireless terminal 150 is sufficiently close to a subscribed location 130 such that it is deemed to be at the subscribed location 130. The definition of "sufficiently close" may always be the same or may vary depending upon the application. For example, it may required that the wireless terminal 150 is within 10 feet, or a minimum resolution distance of the subscribed location 130, to ensure that the wireless terminal 150 is actually carried on the person of the user 160. However, this distance may be relaxed by a user, for example, based on a preference in the subscriber record.

Figure 5:
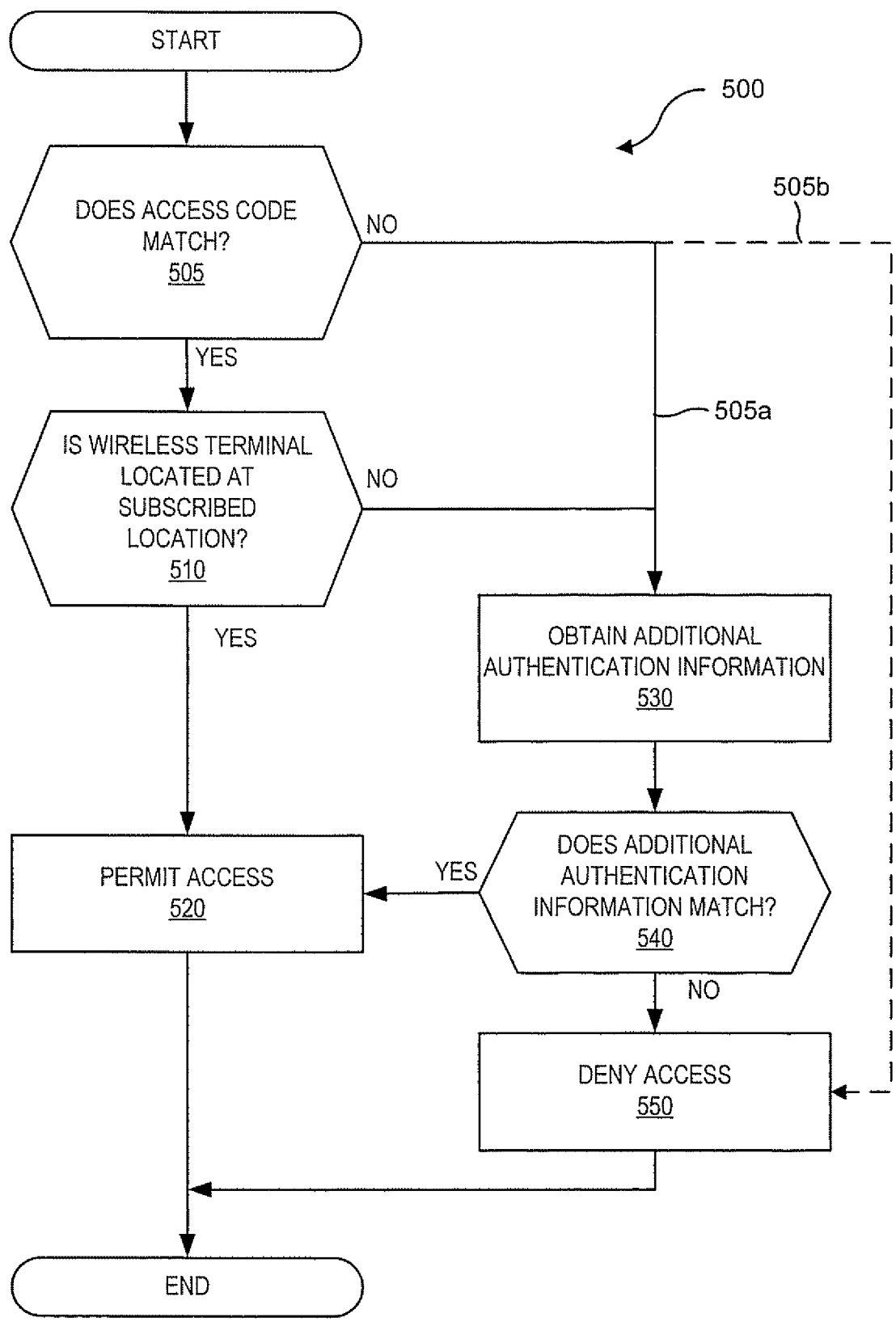

FIG. 5 illustrates certain operations 500 associated with correlating the location of a wireless terminal 150 with a subscribed location and, in response to the correlation, generating authorization information for the access request. As shown in FIG. 5, if an access code was entered by the person attending to gain access to the subscribed location 130, the access authorization server 110 may check to see if the access code matches an access code stored in the subscriber record (Block 505). If so, the operations proceed to Block 510. However, if the access code does not match the access code stored in the subscriber record, the access authorization server 110 may obtain additional authentication information before permitting access (Block 530), as indicated by flow line 505*a*. However, as indicated by the dashed flow line 505*b*, in some embodiments, if the access code entered by the person attempting to gain access does not match the stored access code, the access authorization server 110 may immediately deny the access (Block 550).

At Block 510, it is determined whether or not a wireless terminal 150 identified in the subscriber record is located at the subscribed location 130. In some embodiments, the wireless terminal 150 may be associated in the subscriber record with the person making the access attempt. As described above, the identity of the person making the access request may be provided to the security processor 170, for example, by entering a code or other identifier associated with that particular person.

As noted above, the wireless terminal 150 may be determined to be at the subscribed location 130 if the wireless terminal 150 is located no more than a threshold distance away from the subscribed location 130. If it is determined that the wireless terminal 150 is located at the subscribed location 130, then the access may be granted (Block 520). However, if it is determined that the wireless terminal 150 is not located at the subscribed location 130, then additional authentication information may be obtained from the person attempting the gain access in order to confirm that the access is authorized (Block 530). In some embodiments, if multiple wireless terminals 150 are identified in the subscriber record as being associated with a particular user 160, additional authentication information may be obtained if none of the wireless terminals 150 is located at a subscribed location. In other embodiments, if multiple wireless terminals 150 are identified in the subscriber record as being associated with a particular user 160, additional authentication information may be obtained if any one of the wireless terminals 150 is not located at the subscribed location 130.

Additional authentication may be provided in a number of ways. For example, the access authorization server 110 can instruct the security processor 170 to have the person attempting to gain access enter a security code, such as a PIN number. In some embodiments, the access authorization server 110 can instruct the security processor 172 to obtain biometric data from the person attending to gain access, such as via a camera, a fingerprint scanner, a retinal scanner, and/or a microphone. The biometric data may be processed by the security processor 170, or may be forwarded to the access authorization processor 116 for processing.

The additional authentication information is checked by the security processor 170 and or by the access authorization server 110 to see if it matches the information stored in the subscriber record for the subscribed location 130 (Block 540). If the additional authentication information provided by the user 160 matches the expected information, for example if the user 160 provides the correct access code in response to a request by the security processor 170, or if the biometric data provided by the person requesting access matches biometric data stored in the subscriber record, then the access may be granted (Block 520). Otherwise, access may be denied (Block 550).

Figure 6:
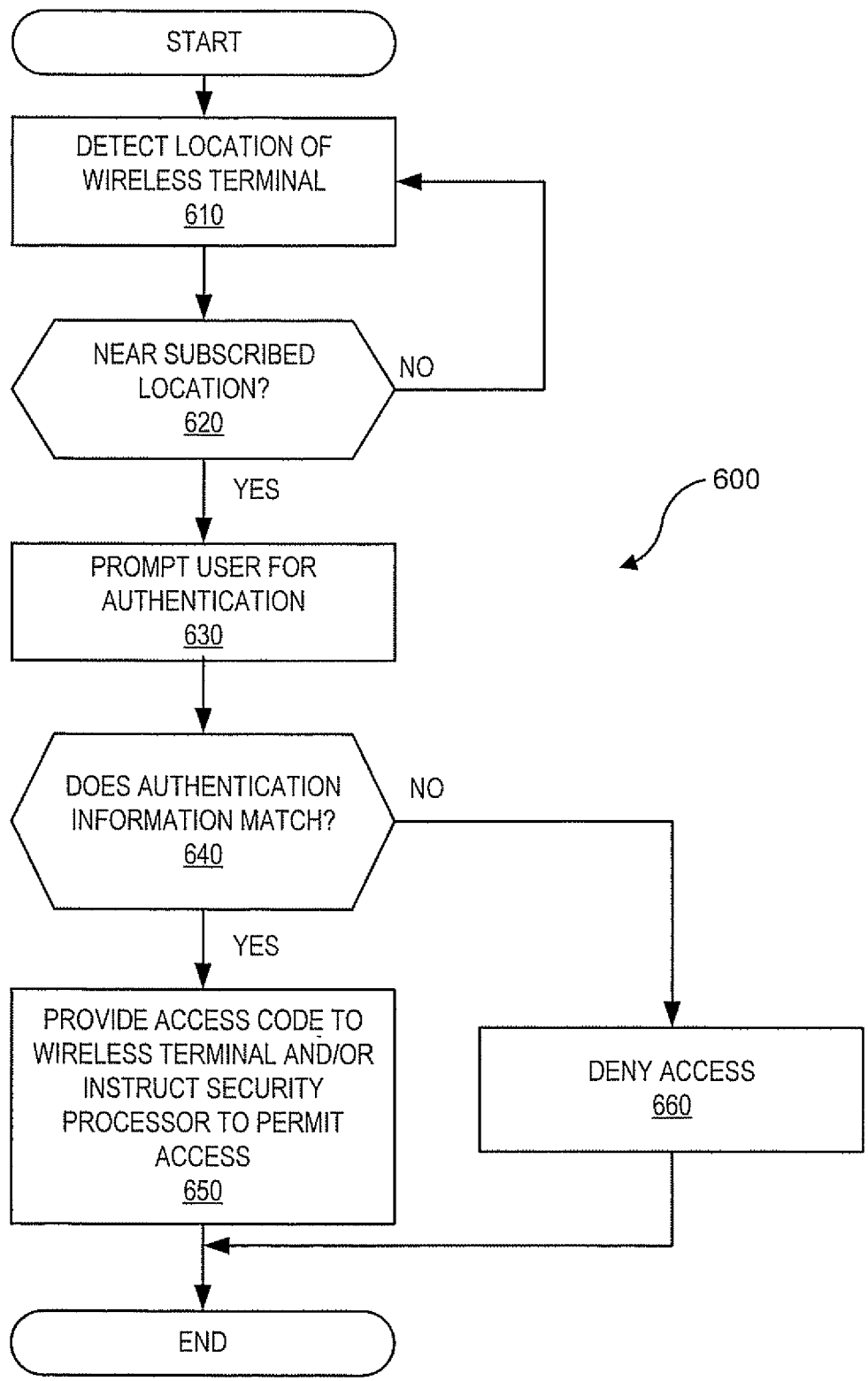

Referring to FIG. 6, in some embodiments, the access authorization server 110 may detect the location of a wireless terminal 150 that is associated with a subscribed location 130 (Block 610). If the wireless terminal 130 comes near the subscribed location (Block 620), the access authorization server 110 may automatically prompt the user 160 to provide authentication information, such as an access code or biometric identification information, to obtain access to the subscribed location 130 (Block 630). The authentication information is checked to determine if it matches the authentication information for the user stored in the subscriber database 117 (Block 640).

If the user 160 enters a correct access code or the biometric identification information provided by the user 160 is authenticated, the access authorization server 110 may send a signal to the security processor 170 at the subscribed location 130 indicating that access should be granted to the user 160, e.g. by unlocking a door (Block 650). In some embodiments, if the user 160 is authenticated, the access authorization server 110 may send a temporary entry code to the user 160 via the wireless terminal 150, and may also send the temporary entry code to the security processor 170. The user 160 may then gain access to the subscribed location 130, for example, by entering the temporary entry code provided to both the user 150 and the security processor 170 into the keypad 172.

The wireless terminal 150 may be used to provide biometric identification data to the access authorization server 110. For example, the biometric identification data may include voiceprint information. Thus, when a user 160 approaches a subscribed location 130, a voice connection may be established between the wireless terminal 150 and the access authorization server 110 via the wireless network interface 114. The voice connection may be established in response to a user input or may be automatically established by the access authorization server 110 when the user approaches the subscribed location 130. The user 160 may speak a phrase into the wireless terminal, such as "Request Access" or "Open Front Door" which is than analyzed by the access authorization server 110 to determine if the speaker is the user 160 associated with the wireless terminal 150. Voice identification techniques are well known in the art. Such techniques may include voice coding a spoken comparison phrase to obtain a set of voice filter coefficients corresponding to the comparison phrase and comparing the obtained filter coefficients with a set of pre-stored filter coefficients obtained from voice coding a training phrase spoken by a known speaker. Such techniques may tend to work best when the comparison phrase is the same as the training phrase.

If the user 160 enters an incorrect access code or the biometric identification information provided by the user 160 is not authenticated, access is denied (Block 660).

Figure 7:
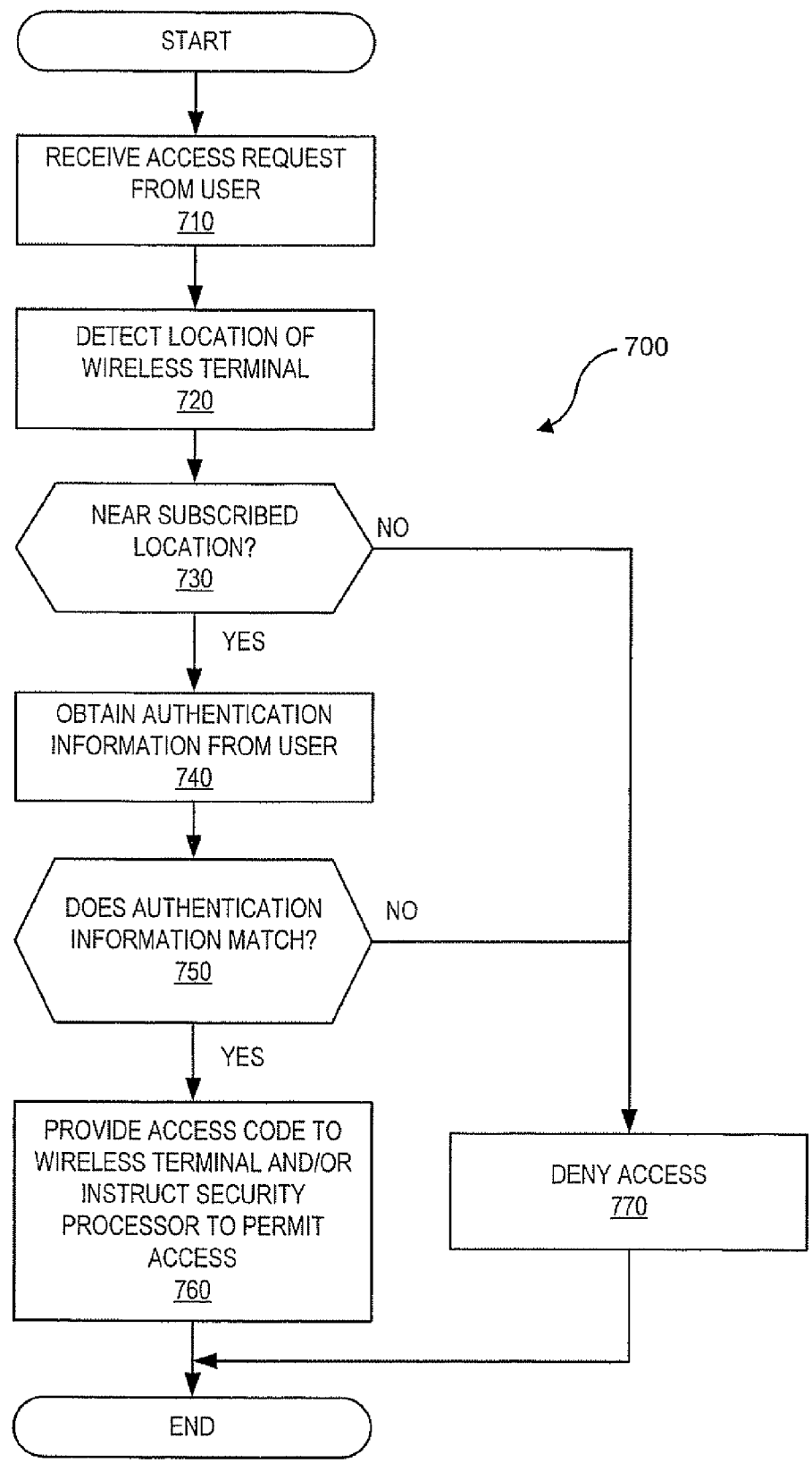

Referring to FIG. 7, in some embodiments, when a user 160 carrying a wireless terminal 150 approaches a subscribed location 130, the user 160 may initiate a request to the access authorization server 110 through the wireless terminal 150 requesting access to the subscribed location 130 (Block 710). In response, the access authorization server 110 may detect the location of the wireless terminal 150 (Block 720) and determine if it is near a subscribed location 130 (Block 730). If the wireless terminal 150 is not near a subscribed location, access may be denied (Block 770). However, if the wireless terminal 150 is near a subscribed location 130, the access authorization server 110 may prompt the user 160 to provide authentication information, such as an access code or biometric identification information, to obtain access to the subscribed location 130 (Block 740).

The authentication information is checked to determine if it matches the authentication information for the user 160 stored in the subscriber database 117 (Block 750). If the user 160 is authenticated, then the access authorization server 110 may send an access code to the user 160 via the wireless terminal 150 to be entered, for example, into the keypad 172 to obtain access to the subscribed location 130, or the access authorization server 110 may instruct the security processor 170 to permit access to the user 160 (Block 760). Otherwise, access may be denied (Block 770).

Accordingly, as an example, a user 160 who is approaching the door of a subscribed location equipped with a security processor 170 may send a signal to the access authorization server 110 by selecting an appropriate menu option on the wireless terminal 150. In response, the access authorization server 110 may check the location of the wireless terminal 150 to determine if the user is actually near the subscribed location 130. If so, the access authorization server 110 may authenticate the user 160 by, for example, prompting the user 160 to speak a comparison phrase and/or enter a security code into the wireless terminal 150. If the user 160 is determined to be authentic, the access authorization server 110 may cause the security processor 170 to provide access to the subscribed location 130 and/or may provide a temporary security code to the user 160 and the security processor 170 to permit the user 160 to gain access to the subscribed location 130.

Accordingly, some embodiments of the invention may provide more secure access to the subscribed location than keycard entry, since the identity of the user 160 may be authenticated before access is granted. Thus, even if a wireless terminal 150 is stolen, then according to some embodiments, the wireless terminal 150 may not be used by the thief to gain access to the subscribed location 130. In contrast, a keycard entry system may be compromised if a keycard is stolen.

Furthermore, some embodiments of the invention may be used to provide access to other types of systems and/or locations. For example, embodiments of the invention may be used to provide secure authenticated access to automated teller machines (ATMs). One drawback to the use of ATMs is that a permanent PIN code is assigned to an ATM user's account. If a thief learns a PIN code, for example, by observing a user enter the PIN code into an ATM, they may be able to gain access to the user's bank account. However, some embodiments of the invention may be used to provide an account owner with a temporary PIN code that may be used to obtain access to the user's bank account at a particular time and location.

Accordingly, as an example, a user 160 who is approaching an ATM that corresponds to a subscribed location 130 may send a signal to the access authorization server 110 by selecting an appropriate menu option on the wireless terminal 150. In response, the access authorization server 110 may check the location of the wireless terminal 150 to determine if the user 160 is actually near the ATM. If so, the access authorization server 110 may authenticate the user by, for example, prompting the user 160 to speak a comparison phrase and/or enter a security code into the wireless terminal 150. If the user 160 is determined to be authentic, the access authorization server 110 may send a temporary PIN code to the user via the wireless terminal 150 and may cause the security processor 170 to accept the temporary PIN code from the user 160 to permit the user 160 to gain access to the their account on the ATM. Thus, even if a thief observes the user 160 entering the temporary PIN code, the same code could not be used again to obtain access to the user's bank account.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A tangible computer server, for authorizing access for a user, comprising:
   an access authorization processor; and
   a computer-readable storage device comprising computer-readable instructions that, when executed by the access authorization processor, cause the access authorization processor to perform operations comprising:
   receiving information concerning an access attempt from a subscribed location;
   obtaining first location information corresponding to a first wireless terminal of multiple wireless terminals associated with a subscriber account, the subscriber account being associated with the subscribed location, and the first location information indicating a first location for the first wireless terminal of the multiple wireless terminals;
   correlating the first location to the subscribed location in a first correlation act;

obtaining second location information corresponding to a second wireless terminal of multiple wireless terminals associated with a subscriber account, the subscriber account being associated with the subscribed location, and the second location information indicating a second location for the second wireless terminal of the multiple wireless terminals;

correlating the second location to the subscribed location in a second correlation act;

if both of the first correlation act and the second correlation act results in satisfactory results:
    generating authorization information corresponding to the access attempt; and
    transmitting the authorization information to a security processor associated with the subscribed location; and initiating, if at least one of the first correlation act and the second correlation act results in an unsatisfactory result, obtaining additional authentication information concerning the access attempt.

2. The tangible computer server of claim 1, wherein:
the first correlation act results in the unsatisfactory result if a first determination is made that the first wireless terminal associated with the subscriber account is not within a predetermined proximity of the subscribed location; and
the second correlation act results in the unsatisfactory result if a second determination is made that the second wireless terminal associated with the subscriber account is not within the predetermined proximity of the subscribed location.

3. The tangible computer server of claim 1, wherein the correlation acts both result in satisfactory results if both of the first wireless terminal and the second wireless terminal are within a predetermined proximity of the subscribed location.

4. The tangible computer server of claim 1, wherein:
the operations further comprise sending a temporary access code to the particular wireless terminal of the multiple wireless terminals, for allowing presentation of the temporary access code to the security processor in a communication; and
the operation of transmitting the authorization information to the security processor associated with the subscribed location comprises sending the temporary access code to the security processor, for allowing the security processor to confirm accuracy of the communication based on the temporary access code received by the security processor.

5. The tangible computer server of claim 1, wherein the operations further comprise:
determining that the first wireless terminal, of the multiple wireless terminals, is near the subscribed location; and
initiating, in response to determining that the first wireless terminal is near the subscribed location, prompting of the first wireless terminal for first authentication information.

6. The tangible computer server of claim 1, wherein the operations further comprise:
determining that the first wireless terminal, of the multiple wireless terminals, is near the subscribed location; and
initiating, in response to determining that the first wireless terminal is near the subscribed location, a biometric evaluation between the security processor and the user by way of the first wireless terminal.

7. The tangible computer server of claim 6, wherein the operation of initiating the biometric evaluation between the security processor and the user comprises prompting, by way of the first wireless terminal, for a user-voice input to be analyzed by the security processor in connection with providing access for the user.

8. The tangible computer server of claim 7, wherein prompting for the voice input comprises prompting, by way of the first wireless terminal, for a select comparison phrase to be analyzed by the security processor in connection with providing access for the user.

9. The tangible computer server of claim 1, wherein:
the first and second correlation acts comprise determining whether the first and second wireless terminals, respectively, is within a predetermined proximity of the subscribed location; and
the predetermined proximity is variable and based on user preference.

10. The tangible computer server of claim 1, wherein:
the tangible computer server is configured to authorize access, for the user, to a secured physical area;
the security processor is associated with the secured physical area;
the operation of receiving information concerning an access attempt comprises receiving information regarding an attempt by the user to access the secured physical location; and
the operation of transmitting the authorization information to a security processor associated with the subscribed location comprises transmitting authorization information to the security processor for granting access by the user to the secured physical location.

11. A computer-readable storage device comprising computer-readable instructions that, when executed by the access authorization processor, cause the access authorization processor to perform operations comprising:
receiving information concerning an access attempt from a subscribed location;
obtaining first location information corresponding to a first wireless terminal of multiple wireless terminals associated with a subscriber account, the subscriber account being associated with the subscribed location, and the first location information indicating a first location for the first wireless terminal of the multiple wireless terminals;
correlating the first location to the subscribed location in a first correlation act;
obtaining second location information corresponding to a second wireless terminal of multiple wireless terminals associated with a subscriber account, the subscriber account being associated with the subscribed location, and the second location information indicating a second location for the second wireless terminal of the multiple wireless terminals;
correlating the second location to the subscribed location in a second correlation act;
if both of the first correlation act and the second correlation act results in satisfactory results:
    generating authorization information corresponding to the access attempt; and
    transmitting the authorization information to a security processor associated with the subscribed location; and
initiating, if at least one of the first correlation act and the second correlation act results in an unsatisfactory result, obtaining additional authentication information concerning the access attempt.

12. The computer-readable storage device of claim 11, wherein:

the first correlation act results in the unsatisfactory result if a first determination is made that the first wireless terminal associated with the subscriber account is not within a predetermined proximity of the subscribed location; and the second correlation act results in the unsatisfactory result if a second determination is made that the second wireless terminal associated with the subscriber account is not within the predetermined proximity of the subscribed location.

13. The computer-readable storage device of claim 11, wherein the correlation acts both result in satisfactory results if both of the first wireless terminal and the second wireless terminal are within a predetermined proximity of the subscribed location.

14. The computer-readable storage device of claim 11, wherein:

the operations further comprise sending a temporary access code to the particular wireless terminal of the multiple wireless terminals, for allowing presentation of the temporary access code to the security processor in a communication; and the operation of transmitting the authorization information to the security processor associated with the subscribed location comprises sending the temporary access code to the security processor, for allowing the security processor to confirm accuracy of the communication based on the temporary access code received by the security processor.

15. The computer-readable storage device of claim 11, wherein the operations further comprise:

determining that the first wireless terminal, of the multiple wireless terminals, is near the subscribed location; and initiating, in response to determining that the first wireless terminal is near the subscribed location, prompting of the first wireless terminal for first authentication information.

16. The computer-readable storage device of claim 11, wherein the operations further comprise:

determining that the first wireless terminal, of the multiple wireless terminals, is near the subscribed location; and initiating, in response to determining that the first wireless terminal is near the subscribed location, a biometric evaluation between the security processor and a user by way of the first wireless terminal.

17. A method, for authorizing access for a user, comprising:

receiving, by a tangible system using a processor, information concerning an access attempt from a subscribed location;

obtaining, by the tangible system, first location information corresponding to a first wireless terminal of multiple wireless terminals associated with a subscriber account, the subscriber account being associated with the subscribed location, and the first location information indicating a first location for the first wireless terminal of the multiple wireless terminals;

correlating, by the tangible system, the first location to the subscribed location in a first correlation act;

obtaining, by the tangible system, second location information corresponding to a second wireless terminal of multiple wireless terminals associated with a subscriber account, the subscriber account being associated with the subscribed location, and the second location information indicating a second location for the second wireless terminal of the multiple wireless terminals;

correlating, by the tangible system, the second location to the subscribed location in a second correlation act;

if both of the first correlation act and the second correlation act results in satisfactory results:

generating, by the tangible system, authorization information corresponding to the access attempt; and transmitting, by the tangible system, the authorization information to a security processor associated with the subscribed location; and initiating, by the tangible system, if at least one of the first correlation act and the second correlation act results in an unsatisfactory result, obtaining additional authentication information concerning the access attempt.

18. The method of claim 17, wherein:

the first correlation act results in the unsatisfactory result if a first determination is made that the first wireless terminal associated with the subscriber account is not within a predetermined proximity of the subscribed location; and the second correlation act results in the unsatisfactory result if a second determination is made that the second wireless terminal associated with the subscriber account is not within the predetermined proximity of the subscribed location.

19. The method of claim 17, wherein the correlation acts both result in satisfactory results if both of the first wireless terminal and the second wireless terminal are within a predetermined proximity of the subscribed location.

20. The method of claim 17, further comprising:

determining that the first wireless terminal, of the multiple wireless terminals, is near the subscribed location; and initiating, in response to determining that the first wireless terminal is near the subscribed location, a biometric evaluation between the security processor and a user by way of the first wireless terminal.

* * * * *